(12) United States Patent
Ono (10) Patent No.: US 9,327,552 B2
(45) Date of Patent: May 3, 2016

(54) BEARING STRUCTURE (71) Applicant: HINO MOTORS, LTD., Hino-shi (JP)

(72) Inventor: Nobuharu Ono, Tokyo (JP)

(73) Assignee: HINO MOTORS, LTD., Hino-shi (JP)

( * ) Notice: Subject to any disclaimer, the term of this patent is extended or adjusted under 35 U.S.C. 154(b) by 0 days.

(21) Appl. No.: 14/403,739

(22) PCT Filed: May 28, 2013

(86) PCT No.: PCT/JP2013/003350
§ 371 (c)(1),
(2) Date: Nov. 25, 2014

(87) PCT Pub. No.: WO2013/179643
PCT Pub. Date: Dec. 5, 2013

(65) Prior Publication Data
US 2015/0137585 A1      May 21, 2015

(30) Foreign Application Priority Data

May 31, 2012  (JP) .................................. 2012-123909
Jun. 14, 2012  (JP) .................................. 2012-134592

(51) Int. Cl.
*B60B 27/06*      (2006.01)
*B60B 27/00*      (2006.01)
(Continued)

(52) U.S. Cl.
CPC ........... *B60B 27/0073* (2013.01); *B60B 27/001* (2013.01); *B60B 27/02* (2013.01); *F16C 33/6603* (2013.01); *F16C 33/6622* (2013.01); *F16C 33/6681* (2013.01); *F16C 33/78* (2013.01); *F16D 59/00* (2013.01);
(Continued)

(58) Field of Classification Search
CPC .............. B60B 27/0073; B60B 27/001; B60B 27/0015; B60B 27/0047; B60B 27/0057; F16C 33/66; F16C 33/6603; F16C 33/6622; F16C 33/6681; F16C 33/78; F16C 33/7618
USPC ......... 301/105.1, 106, 107, 109, 110, 111.01, 301/112, 111.03, 111.04, 111.05, 111.06, 301/111.07
See application file for complete search history.

(56) References Cited

U.S. PATENT DOCUMENTS

| 7,004,290 B2 * | 2/2006 | Ohtsuki ................ B60T 8/3255 188/162 |
| 2004/0164608 A1 | 8/2004 | Ohtsuki et al. |
| 2005/0018939 A1 * | 1/2005 | Niwa ...................... B60B 27/00 384/544 |

FOREIGN PATENT DOCUMENTS

| JP | 6-85102 | 12/1994 |
| JP | 11-201979 | 7/1999 |

(Continued)

OTHER PUBLICATIONS

International Search Report Issued Sep. 3, 2013 in PCT/JP13/003350 Filed May 28, 2013.

*Primary Examiner* — John Walters
(74) *Attorney, Agent, or Firm* — Oblon, McClelland, Maier & Neustadt, L.L.P.

(57) ABSTRACT

A deflector is arranged to prevent differential oil, as lubrication oil, leaking from a gap between a rod of an axle and a shaft portion of a drive shaft and passing through a unit bearing, from attaching to an inner periphery of a brake drum. A guide groove unit is formed on an inward surface of a hub in a vehicle-width direction so as to guide the differential oil leaking into an internal space defined inside of the deflector to outside of the brake drum.

8 Claims, 7 Drawing Sheets

(51) Int. Cl.
- *B60B 27/02* (2006.01)
- *F16D 65/00* (2006.01)
- *F16D 65/10* (2006.01)
- *F16C 33/66* (2006.01)
- *F16C 33/78* (2006.01)
- *F16D 59/00* (2006.01)
- *B60B 35/14* (2006.01)
- *B60B 35/18* (2006.01)
- *F16C 19/38* (2006.01)
- *B60B 35/16* (2006.01)

(52) U.S. Cl.
CPC ............... *F16D 65/00* (2013.01); *F16D 65/10* (2013.01); *B60B 27/0015* (2013.01); *B60B 27/0057* (2013.01); *B60B 35/14* (2013.01); *B60B 35/16* (2013.01); *B60B 35/18* (2013.01); *B60B 2900/113* (2013.01); *B60B 2900/321* (2013.01); *B60B 2900/5118* (2013.01); *B60B 2900/561* (2013.01); *B60Y 2200/14* (2013.01); *F16C 19/386* (2013.01); *F16C 2326/02* (2013.01)

(56) References Cited

FOREIGN PATENT DOCUMENTS

| | | |
|---|---|---|
| JP | 2004-255962 | 9/2004 |
| JP | 2007-002884 | 1/2007 |

\* cited by examiner

FIG. 9

BEARING STRUCTURE

TECHNICAL FIELD

The present invention relates to a bearing structure.

BACKGROUND ART

Figure 1:
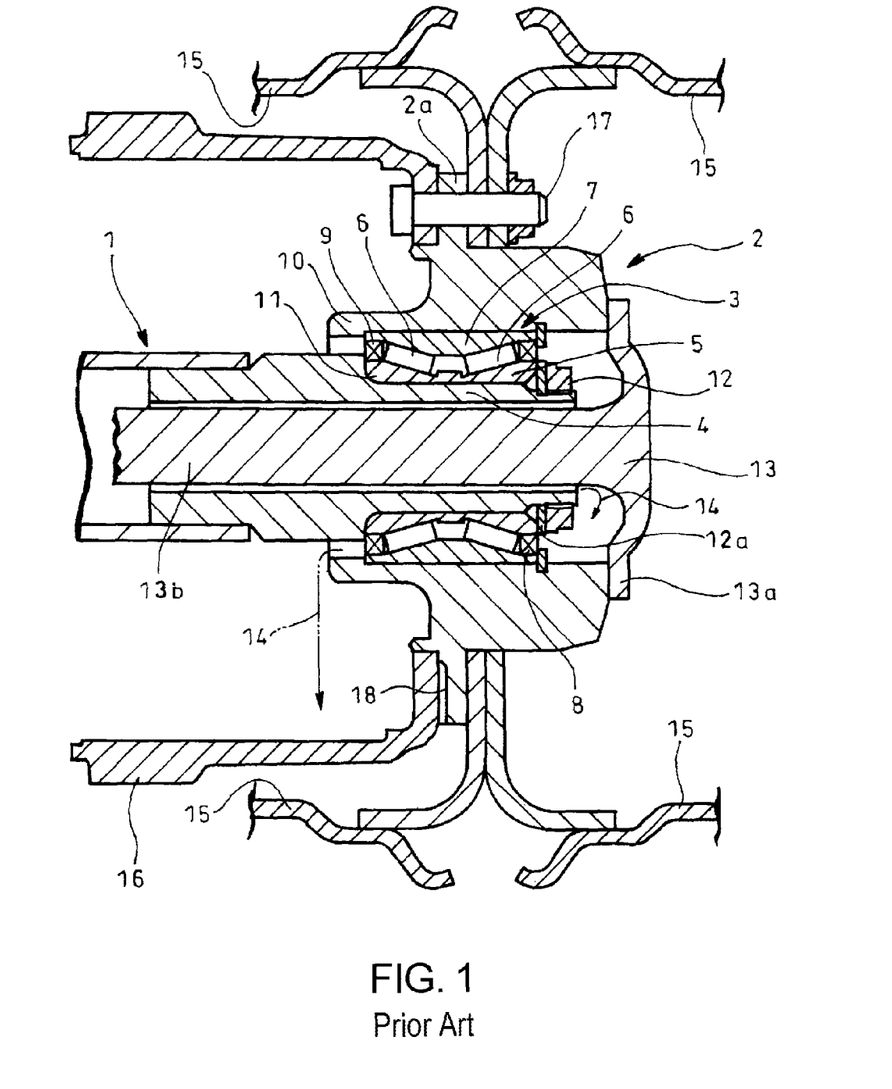
FIG. 1 is a sectional side elevation showing an example of conventional bearing structures.

FIG. 1 shows an example of a conventional bearing structure used for axles of a truck. An axle 1 has ends each of which rotatably supports, via a unit bearing 3, a hub 2 for mounting of wheels (not shown). The unit bearing 3 is a preliminarily unitized assembly comprising an inner race 5 fitted over a rod 4 which in turn is protruded from the end of the axle 1 outward in a vehicle-width direction (right in FIG. 1), rollers or other rolling bodies 6 rotatably on an outer periphery of the inner race 5, an outer race 7 encircling the outer periphery of the inner race 5 to rotatably carry the rolling bodies 6 and oil and dust seals 8 and 9 as seal members for closing a gap between the outer and inner races 7 and 5 oppositely in the vehicle-width direction to enclose grease (not shown) in the gap.

The unit bearing 3 is press-fitted to an inner periphery of the hub 2 such that the outer race 7 is tightly fitted with the inner periphery of the hub 2; and a portion of the hub 2 inward in the vehicle-width direction (left in FIG. 1) is formed with an abutment 10 on which the outer race 7 of the unit bearing 3 abuts for positioning.

The inner race 5 is clearance-fitted (loose-fitted) over the rod 4 of the axle 1 in consideration of workability, the inner race 5 abutting at one end thereof on a step 11 of the rod 4 and being clamped and fixed at the other end thereof by a spindle nut 12 through a washer 12a. The washer 12a has an inner periphery from which a number of stops (not shown) are projected at required peripheral positions and are fitted into corresponding grooves (not shown) on an outer periphery of the rod 4, so that even in case the inner race 5 is rotated relative to the rod 4 and its rotational force is transmitted to the spindle nut 12, the spindle nut 12 is prevented from being loosened.

Inserted into the axle 1 from the rod 4 side is a drive shaft 13 for rotation of the wheels (not shown) together with the hub 2. The drive shaft 13 has an end away from an inserted end thereof and formed with a flange 13a which in turn is fixed on an outer side surface of the hub 2 by an bolt or other fastening member or members (not shown).

The dust seal 9 in the unit bearing 3 inward in the vehicle-width direction serves not only for enclosing the grease inside but also for preventing outside water and foreign matters from invading. The oil seal 8 outward in the vehicle-width direction serves also for preventing differential oil 14 as lubrication oil, which leaks from a gap between the rod 4 of the axle 1 and a shaft portion 13b of the drive shaft 13, from invading into the unit bearing 3.

Further, mounted on the flange 2a of the hub 2 at surfaces thereof outward and inward in the vehicle-width direction are tire wheels 15 and a brake drum 16, respectively, by bolt and nut or other fastening members 17. Incidentally, illustrated in FIG. 1 is a dual-tire mode in which two tires (not shown) are mounted on the hub 2 on each side thereof in the vehicle-width direction through the tire wheels 15. The surface of the hub 2 inward in the vehicle-width direction is formed, at peripheral positions, with lightening depressions 18.

General state of the art pertinent to the bearing structure as mentioned in the above is shown, for example, in Patent Literature 1.

Figure 2:
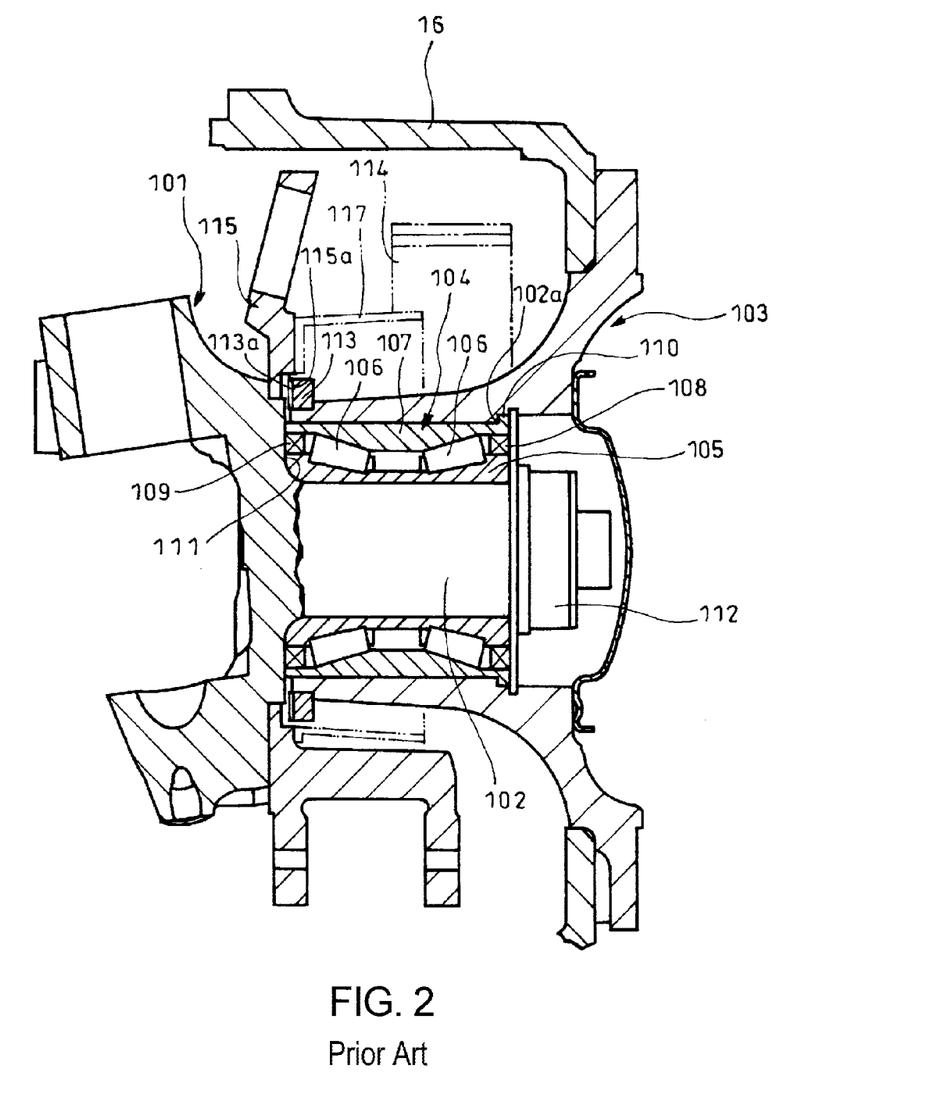
FIG. 2 is a sectional view showing a further example of the conventional bearing structures.

FIG. 2 shows an example of an independent suspension structure on a front side (steering wheel side) in a truck or the like. In FIG. 2, reference numeral 101 denotes a knuckle connected with a tie rod (not shown) for an steering operation. The knuckle 101 has a spindle 102 which is encircled by and rotatably supports, via a unit bearing 104, a hub 103 for mounting of a wheel (not shown).

The unit bearing 104 is a preliminarily unitized assembly comprising an inner race 105 fitted over the spindle 102 of the knuckle 101, rolling bodies (rollers) 106 rotatably on an outer periphery of the inner race 105, an outer race 107 encircling an outer periphery of the inner race 105 to rotatably carry the rolling bodies 106 and oil and dust seals 108 and 109 as seal members for closing a gap between the outer and inner races 107 and 105 oppositely in the vehicle-width direction to enclose grease (especially not shown) in the gap.

The unit bearing 104 is press-fitted to an inner periphery of the hub 103 such that the outer race 107 is tightly fitted with the inner periphery of the hub 103; and an outward portion of the outer race 107 in the vehicle-width direction (right in FIG. 2) is formed with a locking part 110 which engages with a step 102a on an inner periphery of the hub 103 for positioning.

The inner race 105 is clearance-fitted (loose-fitted) over the spindle 102 of the knuckle 101 in consideration of workability, the inner race 105 abutting at one end thereof on an abutment 111 of the knuckle 101 and being clamped and fixed at the other end thereof by a spindle nut 112.

Fixed in a press-fit manner on an outer periphery of an inward end of the hub 103 in the vehicle-width direction (left in FIG. 2) is a pulsar ring 113 formed with a number of teeth 113a on a side surface thereof toward inward in the vehicle-width direction. Passing of the teeth 113a of the pulsar ring 113 is detected and counted by a non-contact sensor (not shown; arranged in a phase different from the section shown) which grasps the passing as, for example, change in magnetic field, whereby number of revolutions of the wheel may be monitored.

Specifically, vehicles nowadays are provided with an antilock brake system (hereinafter referred to as ABS) for prevention of wheels from being locked in a braking operation. This kind of ABS requires to monitor any change in number of revolutions of a wheel upon braking operation to control the braking force, so that the hub 103 rotating in unison with the wheel is provided with the pulsar ring 113.

Further, the knuckle 101 facing the pulsar ring 113 in the vehicle-width direction is provided with a spider 115 for support of a brake shoe 114. Mounted on the hub 103 outward in the vehicle-width direction is a brake drum 116 to which the brake shoe 114 is pushed to produce the braking force.

In the example illustrated, the spider 115 has an inner periphery formed with a step 115a which has a required clearance to and assuredly prevents interference with the pulsar ring 113.

As a prior art literature pertinent to this kind of bearing structure, there already exists, for example, the following Patent Literature 2.

CITATION LIST

Patent Literature

[Patent Literature 1] JPH 06-85102U
[Patent Literature 2] JP 2004-255962A

SUMMARY OF INVENTION

Technical Problems

In the above-mentioned unit bearing 3 as shown in FIG. 1, the oil and dust seals 8 and 9 as unitized seal members are set to have service life capable of maintaining their functions for a long time so as to make the seals maintenance-free.

However, in case the oil and dust seals 8 and 9 deteriorate and the differential oil 14 leaking from the gap between the rod 4 of the axle 1 and the shaft portion 13b of the drive shaft 13 invades through the oil seal 8 into the unit bearing 3 and flows outside through the dust seal 9, it cannot be said that there is no possibility of the differential oil 14 adhering to an inner periphery of the brake drum 16 to cause deteriorated braking. Thus, there is still room for further improvement aiming at enhanced reliability.

Meanwhile, the conventional pulsar ring 113 shown in FIG. 2 is in the form of a short cylinder with axially uniform diameter, so that the grease leaking from the unit bearing 104 due to malfunction of the dust seal 109 as seal member may flow along the hub 103 to the pulsar ring 113 where the grease may splatter circumferentially due to rotation of the pulsar ring 113 during running of the vehicle, leading to attachment of the grease to the brake shoe and drum 114 and 116 and thus lowering of braking performance.

In order to overcome this, the spider 115 has to be provided with a deflector 117 so as to prevent the grease from attaching to the brake shoe and drum 114 and 116. Since directions of the grease splattering from the pulsar ring 113 cannot be expected beforehand, a large-sized deflector 117 capable of covering a wide range must be arranged, which inevitably increases a number of parts to be assembled and man-hour for assembling, leading to increase in cost and work burden.

The invention was made in view of the above and has its objects to provide a bearing structure wherein, in case lubrication oil flows outside of a bearing due to deteriorated seal members, the lubrication oil can be assuredly prevented from attaching to an inner periphery of a brake drum, thereby preventing deteriorated braking and enhancing reliability, and to provide a bearing structure which can prevent circumferential splattering of grease from a pulsar ring without provision of a deflector.

Solution to Problems

The invention is directed to a bearing structure wherein a hub is rotatably fitted, through a bearing, over a rod protruded from an end of an axle, a drive shaft being inserted into said axle from a rod side and having a flange formed on an end thereof away from the inserted end and fastened to an outward surface of said hub in a vehicle-width direction for rotation of said hub through said drive shaft, a brake drum being mounted on an inward surface of a flange of said hub in the vehicle-width direction for rotation of the brake drum integrally with said hub, said bearing structure comprising a deflector arranged to prevent lubrication oil, which leaks from a gap between the rod of said axle and a shaft portion of the drive shaft to pass through said bearing, from attaching to an inner periphery of the brake drum, and a guide groove unit formed on an inward surface of said hub in the vehicle-width direction to guide the lubrication oil, which leaks in an internal space defined inside of said deflector, outside of the brake drum.

According to the above, the following effects can be obtained.

With the construction mentioned in the above, in case lubrication oil leaks from the gap between the rod of the axle and the shaft portion of the drive shaft to pass through the bearing, said lubrication oil is discharged outside of the internal space defined inside of the deflector by the guide groove unit and does not attach to the brake drum, so that there is no fear of deteriorated braking and reliability can be further enhanced.

In the bearing structure mentioned in the above, it is preferable that said guide groove unit comprises lightening depressions formed on an outer periphery of the inward surface of the flange of the hub in the vehicle-width direction, and discharge grooves on an inward surface of said hub in the vehicle-width direction for communication between said lightening depressions and an internal space defined by said deflector. Then, the lightening depressions can serve not only for lightening in weight but also as portion of the guide groove unit. In addition, the discharge grooves may be preliminarily formed on the inward surface of the hub in the vehicle-width direction upon casting of the hub, which requires no machining and contributes to reduction in machining cost. The fact that the break drum is mounted on the inward surface of the flange of the hub in the vehicle-width direction shortens the length of said brake drum in the vehicle-width direction, which is much effective in combination with lightening in weight by the lightening depressions.

The invention is further directed to a bearing structure wherein a hub is rotatably fitted, via a bearing, over a rod for rotatable support of a wheel, a pulsar ring being integrally fitted over and fixed on an outer periphery of said hub, said bearing structure comprising said pulsar ring having diameters continuously and gradually increased toward inward in the vehicle-width direction and having an outermost end arranged to be radially covered by an existing fixed member.

Thus, in case grease leaking from the bearing due to, for example, malfunction of seal members flows along the hub to the pulsar ring and is centrifuged by rotation of the pulsar ring, then the grease is gathered at and splatters from the outermost end of the pulsar ring radially outwardly, so that all of the splattering grease is prevented by the existing fixed member from circumferentially scattering over a wide range.

Specifically, in the conventional pulsar ring in the form of a short cylinder with axially uniform diameter, grease splattering from the pulsar ring is unfixed in directions and extends over a wide range. However, in the pulsar ring of the invention with the continuously and gradually increased diameters toward inward in the vehicle-width direction, a scattering position of the grease is fixed to the outermost end of the pulsar ring and the scattering direction of the grease is fixed to the radially outward direction from said outermost end, so that the outermost end of the pulsar ring arranged to be radially covered by the existing fixed member can block all of the grease scattering from the outermost end of the pulsar ring.

It is preferable in the invention that the rod rotatably supporting the wheel is a spindle of a knuckle and the existing member is a spider for support of a brake shoe, which can prevent the grease from attaching to the brake shoe on the spider side and the break drum on the hub side.

Further, it is preferable for making the bearing structure maintenance-free that said bearing is a unit bearing comprising in unitized combination an inner race fitted over said rod, rolling bodies rotatable on an outer periphery of said inner race, an outer race encircling the outer periphery of said inner race to rotatably carry the rolling bodies and seal members for closing a gap between said outer and inner races oppositely in the vehicle-width direction to enclose grease.

Advantageous Effects of Invention

According to a bearing structure of the invention, in case the lubrication oil leaks from the bearing to outside due to the deteriorated seal members, the lubrication oil can be reliably prevented from attaching to an inner periphery of the brake drum, which can bring about excellent effects that deteriorated braking can be prevented from occurring and reliability can be enhanced. A driver of the vehicle can find out the differential oil discharged outside during, for example, checkup before startup of the running, which can bring about an excellent effect that repair, exchange or other handling of said seal member can be carried out at earlier stage.

On the other hand, in the bearing structure of the invention where the pulsar ring is shaped to have continuously and gradually increased diameters toward inward in the vehicle-width direction and has an outermost end arranged to be radially covered by the existing fixed member, in case grease leaks from the bearing due to, for example, malfunction of seal members, the grease flowing along the hub to the pulsar ring can be prevented from scattering circumferentially in a wide range by the existing fixed member, which makes it unnecessary to provide a large-sized deflector, thereby reducing a number of parts to be assembled and man-hour for assembling and thus preventing any increase in cost and work burden.

Further, in the bearing structure according to the invention, when the rod rotatably supporting the wheel is a spindle of a knuckle and the existing member is a spider for support of a brake shoe, then the grease can be prevented from attaching to the brake shoe on the spider side and the brake drum on the hub side and thus lowering of braking performance due to attachment of the grease can be prevented.

Still further, in the bearing structure according to the invention, when the bearing is in the form of a unit bearing, it can be made maintenance-free and can fully maintain performance thereof for a long period of time.

DESCRIPTION OF EMBODIMENTS

Next, embodiments of the invention will be described in conjunction with attached drawings.

FIGS. 3-6 show an embodiment of a bearing structure according to the invention in which parts similar to those in the conventional example shown in FIG. 1 are represented by the same reference numerals. The embodiment has a fundamental construction similar to that shown in FIG. 1 and resides in that, as shown in FIGS. 3-6, it comprises a deflector 19 arranged to prevent differential oil 14 as lubrication oil, which leaks from a gap between a rod 4 of an axle 1 and a shaft portion 13b of a drive shaft 13 and passes through a unit bearing 3 as a bearing, from attaching to an inner periphery of a brake drum 16, and a guide groove unit 21 formed on an inward surface on the hub 2 in the vehicle-width direction so as to guide the differential oil 14, which leaks in an internal space 20 defined inside of the deflector 19, outside of the brake drum 16.

In the embodiment, the guide groove unit 21 comprises lightening depressions 18 peripherally on an inward surface of the flange 2a of the hub 2 in the vehicle-width direction, and discharge grooves 22 on the surface of the hub 2 inward in the vehicle-width direction for communication between the lightening depressions 18 and an internal space 20 defined by the deflector 19.

The flange 2a of the hub 2 has an inner periphery formed with a cylindrical support 2b which protrudes toward inward in the vehicle-width direction to engage with an inner periphery of a flange 16a of the brake drum 16. An outer periphery of the cylindrical support 2b is formed, in a gouging manner, with the discharge grooves 22 extending from an inward end of the cylindrical support 2b in the vehicle-width direction (or a portion of the cylindrical support 2b protruding further than an inward end of the flange 16a in the vehicle-width direction) to an inner periphery of the flange 2a (adjacent to a root thereof) so as to communicate with the lightening depressions 18. It is preferable, not necessary, to arrange the discharge grooves 22 circumferentially equidistantly around the hub 2 at a number of (for example, five) required positions.

The deflector 19 comprises a disc 19a with an inner periphery slidably contacting the outer periphery of the rod 4 at a position inwardly of the hub 2 in the vehicle-width direction, a hollow frustoconical portion 19b extending from an outer peripheral end of the disc 19a with gradually increased diameters toward outward in the vehicle-width direction and a flange 19c protruding peripherally from an outward end of the hollow frustoconical portion 19b in the vehicle-width direction. The flange 19c is connected to an inward surface on the flange 16a of the brake drum 16 in the vehicle-width direction by the fastening member or members 17, so that the internal space 20 is defined inwardly of the hub 2 in the vehicle-width direction, the differential oil 14 being guided to the discharge grooves 22 by use of the gradient of the hollow frustoconical portion 19b.

Next, mode of operation of the above embodiment will be described.

Figure 3:
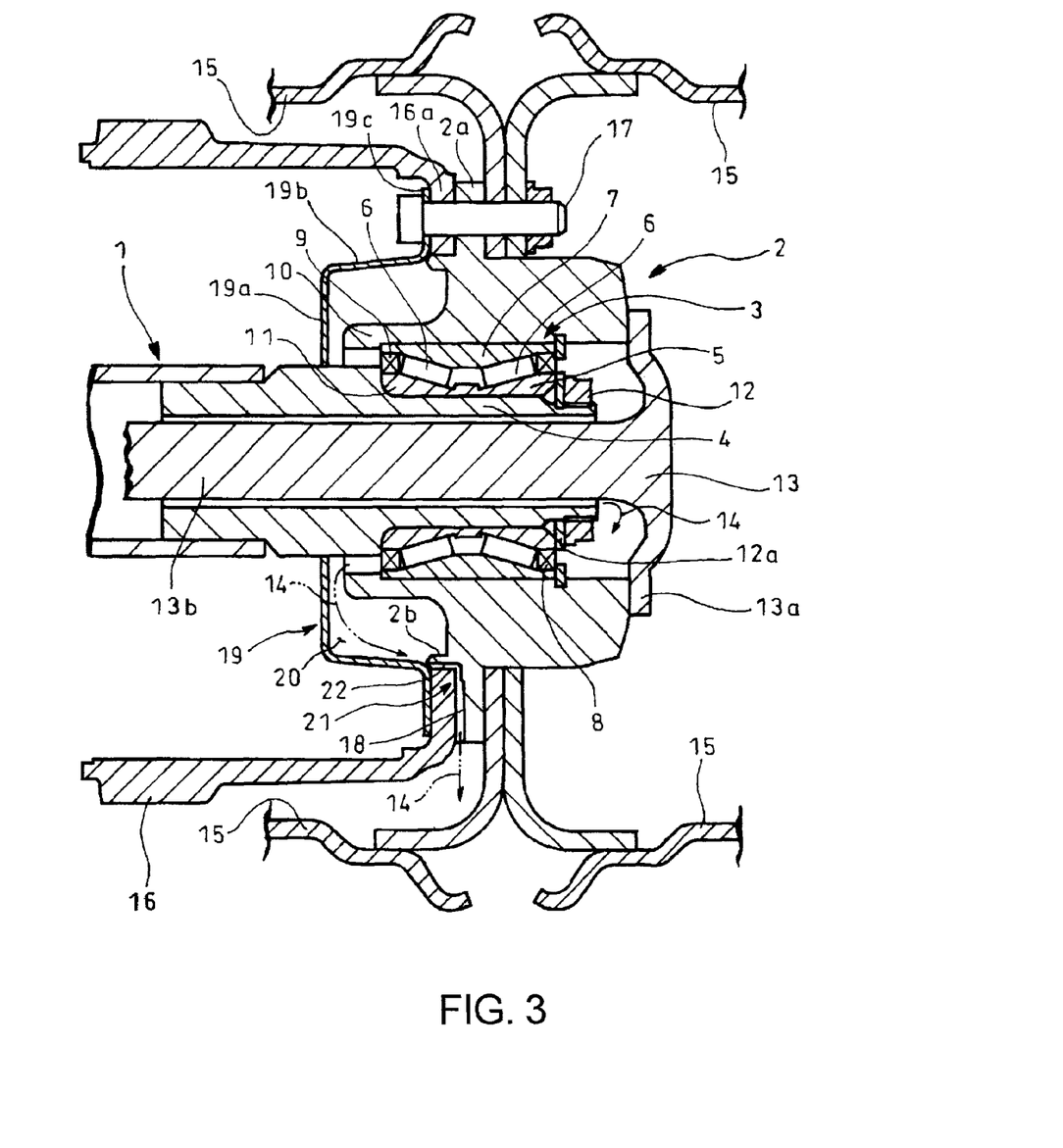
FIG. 3 is a sectional side elevation showing an embodiment of a bearing structure according to the invention.
Figure 4:
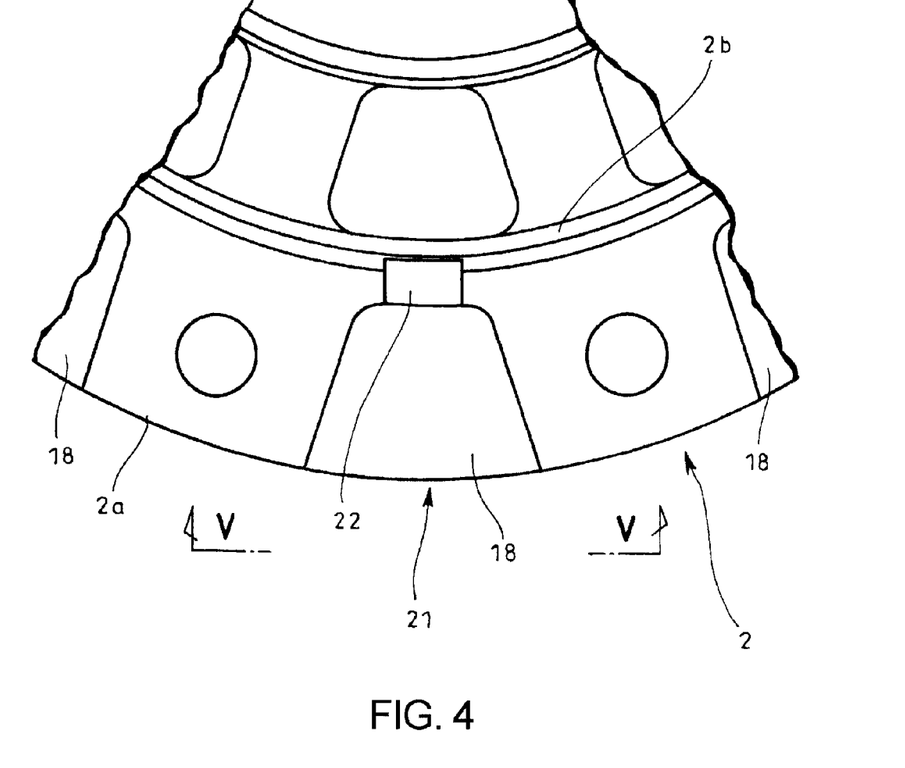
FIG. 4 is a plan view showing lightening depressions and discharge grooves formed on an inward surface of the hub in the vehicle-width direction in the embodiment of the bearing structure according to the invention.
Figure 5:
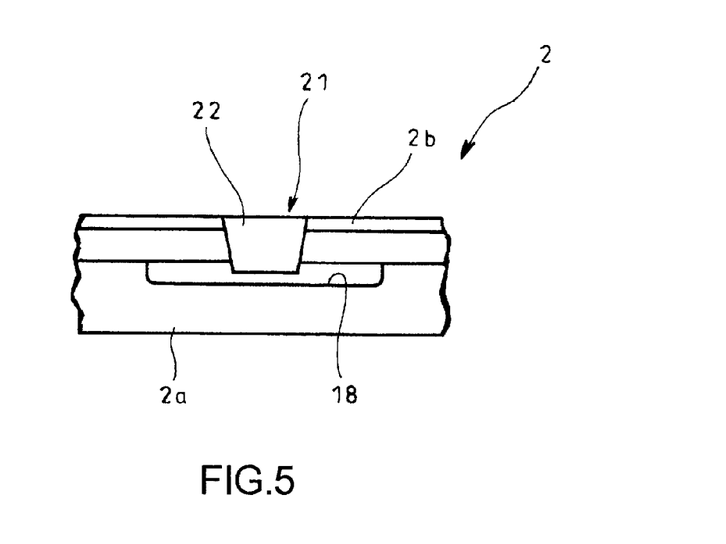
FIG. 5 is a view looking in a direction of arrows V in FIG. 4.
Figure 6:
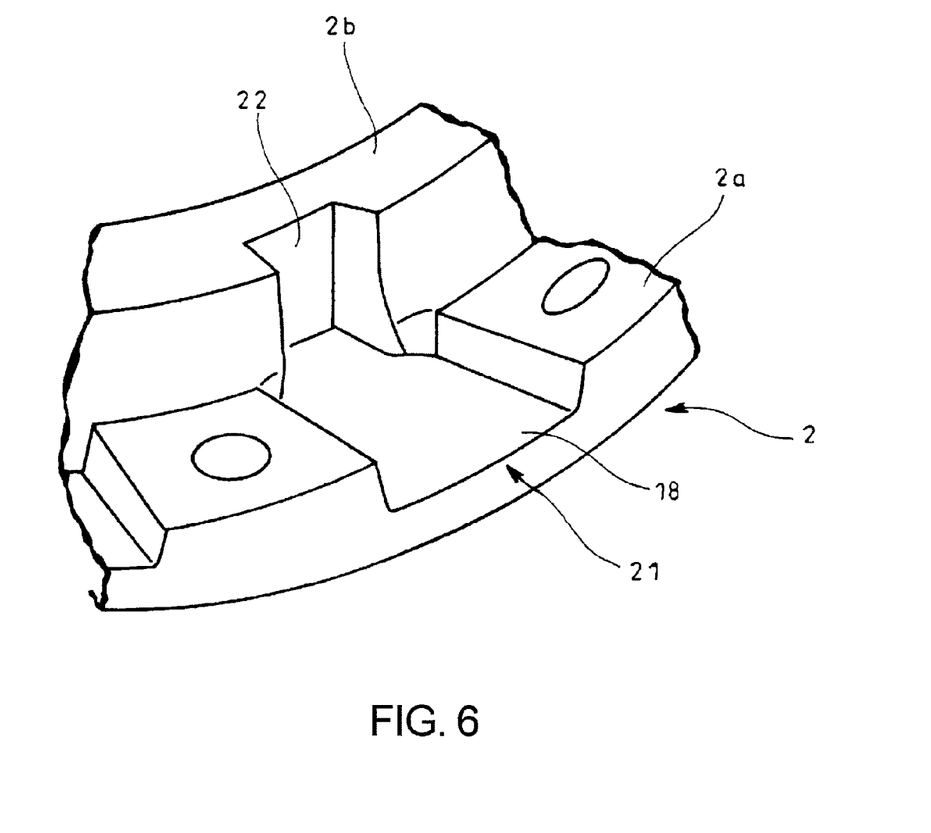
FIG. 6 is a perspective view showing the lightening depression and the discharge groove formed on the inward surface of the hub in the vehicle-width direction in the embodiment of the bearing structure according to the invention.

In the above-mentioned unit bearing 3, the oil and dust seals 8 and 9 as unitized seal members are set to have service life capable of maintaining their functions for a long time so as to make the seal members maintenance-free. In case the oil and dust seals 8 and 9 deteriorate and the differential oil 14 leaking from the gap between the rod 4 of the axle 1 and the shaft portion 13b of the drive shaft 13 invades through the oil seal 8 into the unit bearing 3 and flow out through the dust seal 9 to outside of the unit bearing 3, the differential oil 14 drop down onto an inner surface of the deflector 19 by force of gravity during the vehicle being stopped and scatters to the inner surface of the deflector 19 during running of the vehicle; anyway, it is discharged outside from the discharge grooves 22 of the guide groove unit 21 through the lightening depressions 18 without attaching to the inner periphery of the brake drum 16, which can utterly eliminate fear of deteriorated braking and further enhance the reliability. A driver of the vehicle can find out the differential oil 14 discharged outside during, for example, checkup before startup of the running, and can recognize any trouble in the oil and dust seals 8 and 9 in the unit bearing 3 to carry out repair, exchange or other handling at earlier stage.

Incidentally, the structure according to the embodiment cannot be applied to some European vehicles having the brake drum 16 mounted on the outward surface of the flange 2a of the hub 2 in the vehicle-width direction (inwardly of the portions on which the tire wheels 15 are mounted). For such European vehicles, in order to discharge the differential oil 14 outside, the hub 2 usually produced by casting must be bored. However, such machine-boring leads to increase in cost; moreover, the above-mentioned mounting of the brake drum 16 on the outward surface of the flange 2a of the hub 2 in the vehicle-width direction elongates the cylindrical portion of the brake drum 16 in the vehicle-width direction, which becomes bar against lightening. The bore holes on the hub 2 may be formed upon casting of the hub 2 by casting molds, which, however, inevitably brings about burrs around the holes and results in machining required for removal of the burrs.

By contrast, in the embodiment, the lightening depressions 18 on the outer periphery of the inward surface on the hub 2 in the vehicle-width direction can be served not only for lightening in weight but also for portion of the guide groove unit 21; in addition, the discharge grooves 22 may be preliminarily formed on the inward surface of the hub 2 in the vehicle-width direction upon molding of the hub, which requires no machining and contributes to reduction in machining cost. The fact that the brake drum 16 is mounted on the inward surface of the flange 2a of the hub 2 in the vehicle-width direction shortens the brake drum 16 in the vehicle-width direction, which is much effective in combination with lightening in weight by the lightening depressions 18.

Thus, in case the oil and dust seals 8 and 9 as seal members deteriorate and differential oil 14 passes through the unit bearing 3 as bearing and flows outside, the differential oil 14 can be assuredly prevented from attaching to the inner periphery of the brake drum 16, thereby preventing deteriorated braking from occurring and enhancing the reliability. A driver of the vehicle can find out the differential oil 14 discharged outside during, for example, checkup before startup of the running, so that repair, exchange or other handling of the oil and dust seals 8 and 9 as the seal members can be carried out at earlier stage.

Figure 7:
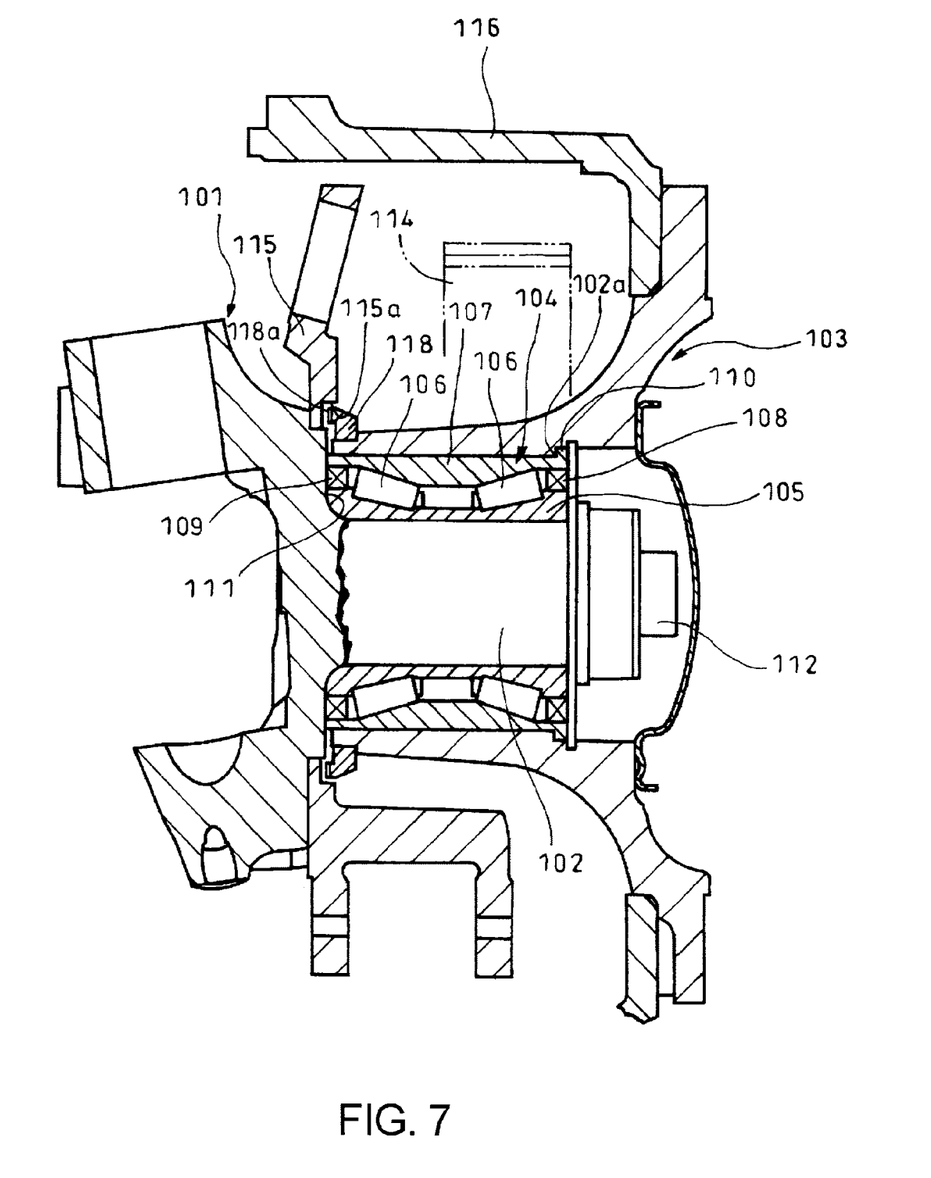
FIG. 7 is a sectional side elevation showing a further embodiment of the bearing structure according to the invention.
Figure 8:
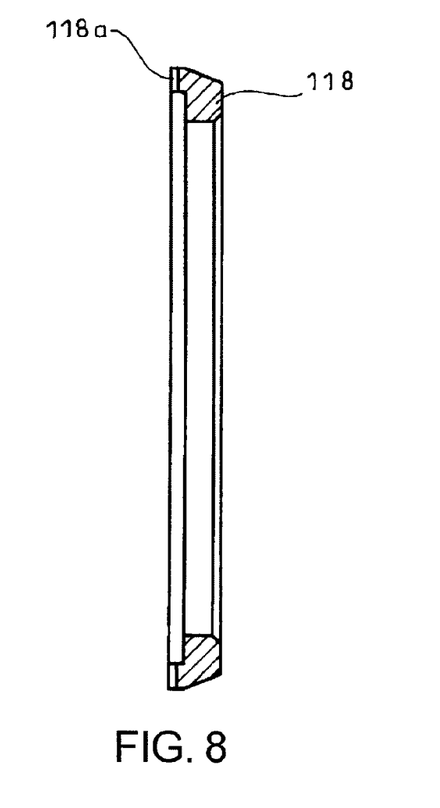
FIG. 8 is a view showing only the pulsar ring in FIG. 7.
Figure 9:
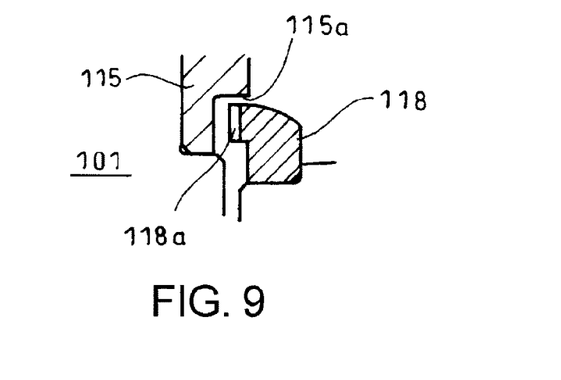
FIG. 9 is a sectional view showing a modification of the pulsar ring shown in FIG. 7.

FIGS. 7-9 show a further embodiment of the bearing structure according to the invention in which parts similar to those in FIG. 2 are represented by the same reference numerals.

As shown in 7, the further embodiment has a fundamental construction similar to that of the conventional axle structure illustrated in FIG. 2. Rotatably supported on a spindle 102 (a rod rotatably supporting the wheel) of a knuckle 101 is a hub 103 through a unit bearing 104 (bearing). Fixed in a press-fit manner on an outer periphery of an inward surface on the hub 103 in the vehicle-width direction (left in FIG. 7) is a pulsar ring 118 with a number of teeth 118a on an inward side surface thereof in the vehicle-width direction. As shown in FIG. 8 which shows only the pulsar ring, the pulsar ring 118 is in the form with continuously and gradually increasing diameters toward inward in the vehicle-width direction, and has an outermost end which is arranged to enter in and be radially covered by a step 115a of a spider 115 (existing member) on the (fixed) knuckle 101.

In the further embodiment, an outer periphery of the pulsar ring 118 has a conical surface with straight up-hill grade toward inward in the vehicle-width direction. Alternatively, as shown in FIG. 9, it may have orbicular surface with arc-like up-hill grade toward inward in the vehicle-width direction.

Thus, in this case, grease leaking from the unit bearing 104 due to, for example, malfunction of the dust seal 109 as seal member flows along the hub 103 to the pulsar ring 118 where the grease is centrifuged by rotation of the pulsar ring 118, is gathered at the outermost end of the pulsar ring 118 to splatter radially outwardly of the outermost end, so that all of the splattering grease is prevented by the spider 115 from splattering peripherally over a wide range.

Specifically, the conventional pulsar ring 113 (see FIG. 2) is in the form of the short cylinder with axially uniform diameter, so that the spattering direction of the grease from the pulsar ring 113 is unfixed and extends over a wide range. However, when the pulsar ring 118 is shaped to have continuously increased diameters toward inward in the vehicle-width direction according to the further embodiment, the spattering position of the grease is fixed to the outermost end of the pulsar ring 118 and the splashed direction of the grease is fixed to the radially outward direction from the outermost end, so that arranging the outermost end of the pulsar ring 118 to be radially covered by the spider 115 can block all of the grease splashing from the outermost end of the pulsar ring 118.

Thus, in the further embodiment mentioned in the above, in case the grease leaks from the unit bearing 104 due to, for example, malfunction of the dust seal 109 as the seal member, the grease flowing along the hub 103 to the pulsar ring 118 can be prevented by the spider 115 from scattering circumferentially over a wide range, which makes it unnecessary to provide a large-sized deflector 117 (see FIG. 2), thereby reducing a number of parts to be assembled and man-hour for assembling and thus preventing any increase in cost and work burden. Thus, the grease can be prevented from attaching to the brake shoe 114 on the spider 115 side and the brake drum 116 on the hub 103 side, thereby preventing any lowering of barking performance due to attachment of the grease.

It is to be understood that a bearing structure according to the invention is not limited to the above embodiments and that various changes and modifications may be made without departing from the scope of the invention. For example, the oil seal as seal member is not restricted to the unit bearing unitized and may be applicable to a combination comprising a separate bearing and separate seal members.

REFERENCE SIGNS LIST

1 axle
2 hub
2a flange
3 unit bearing (bearing)
4 rod
5 inner race
6 rolling bodies
7 outer race
8 oil seal (seal member)
9 dust seal (seal member)
13 drive shaft
13a flange
13b shaft portion
14 differential oil (lubrication oil)
16 brake drum
17 fastening member
18 lightening depressions
19 deflector
20 internal space
21 guide groove unit
22 discharge groove
101 knuckle

102 spindle (rod rotatably supporting wheel)
103 hub
104 unit bearing (bearing)
108 oil seal (seal member)
109 dust seal (seal member)
114 brake shoe
115 spider
116 brake drum
118 pulsar ring
118a teeth

The invention claimed is:

1. A bearing structure wherein a hub is rotatably fitted, through a bearing, over a rod protruded from an end of an axle, a drive shaft being inserted into said axle from a rod side and having a flange formed on an end thereof away from the inserted end and fastened to an outward surface of said hub in a vehicle-width direction for rotation of said hub through said drive shaft, a brake drum being mounted on an inward surface of a flange of said hub in the vehicle-width direction for rotation of the brake drum integrally with said hub, said bearing structure comprising
a deflector arranged to prevent lubrication oil, which leaks from a gap between the rod of said axle and a shaft portion of the drive shaft to pass through said bearing, from attaching to an inner periphery of the brake drum, and
a guide groove unit formed on an inward surface of said hub in the vehicle-width direction to guide the lubrication oil, which leaks in an internal space defined inside of said deflector, outside of the brake drum.

2. The bearing structure according to claim 1 wherein said guide groove unit comprises lightening depressions formed on an outer periphery of the inward surface of the flange of the hub in the vehicle-width direction, and discharge grooves on an inward surface of said hub in the vehicle-width direction for communication between said lightening depressions and an internal space defined by said deflector.

3. The bearing structure as claimed in claim 2, wherein said bearing is a unit bearing comprising in unitized combination an inner race fitted over said rod, rolling bodies rotatable on an outer periphery of said inner race, an outer race encircling the outer periphery of said inner race to rotatably carry the rolling bodies and seal members for closing a gap between said outer and inner races oppositely in the vehicle-width direction to enclose grease.

4. The bearing structure as claimed in claim 1, wherein said bearing is a unit bearing comprising in unitized combination an inner race fitted over said rod, rolling bodies rotatable on an outer periphery of said inner race, an outer race encircling the outer periphery of said inner race to rotatably carry the rolling bodies and seal members for closing a gap between said outer and inner races oppositely in the vehicle-width direction to enclose grease.

5. A bearing structure wherein a hub is rotatably fitted, via a bearing, over a rod for rotatable support of a wheel, a pulsar ring being integrally fitted over and fixed on an outer periphery of said hub, said bearing structure comprising said pulsar ring having diameters continuously and gradually increased toward inward in the vehicle-width direction and having an outermost end arranged to be radially covered by an existing fixed member.

6. The bearing structure as claimed in claim 5, wherein the rod rotatably supporting the wheel is a spindle of a knuckle and the existing member is a spider for support of a brake shoe.

7. The bearing structure as claimed in claim 6, wherein said bearing is a unit bearing comprising in unitized combination an inner race fitted over said rod, rolling bodies rotatable on an outer periphery of said inner race, an outer race encircling the outer periphery of said inner race to rotatably carry the rolling bodies and seal members for closing a gap between said outer and inner races oppositely in the vehicle-width direction to enclose grease.

8. The bearing structure as claimed in claim 5, wherein said bearing is a unit bearing comprising in unitized combination an inner race fitted over said rod, rolling bodies rotatable on an outer periphery of said inner race, an outer race encircling the outer periphery of said inner race to rotatably carry the rolling bodies and seal members for closing a gap between said outer and inner races oppositely in the vehicle-width direction to enclose grease.

* * * * *